(12) United States Patent
Scott

(10) Patent No.: US 6,575,402 B1
(45) Date of Patent: Jun. 10, 2003

(54) COOLING SYSTEM FOR A HYBRID AIRCRAFT

(75) Inventor: Mark Winfield Scott, Bethany, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 10/124,572

(22) Filed: Apr. 17, 2002

(51) Int. Cl.[7] .............................................. B64C 15/00
(52) U.S. Cl. ................... 244/12.2; 244/12.3; 244/23 C; 244/23 B
(58) Field of Search ............................... 244/12.2, 12.3, 244/23 C, 23 B, 57; 416/244 R; 237/DIG. 7

(56) References Cited

U.S. PATENT DOCUMENTS

| | | | | |
|---|---|---|---|---|
| 4,828,203 A | * | 5/1989 | Clifton et al. ............. | 244/12.3 |
| 5,046,685 A | * | 9/1991 | Bose ........................ | 244/12.2 |
| 5,226,350 A |   | 7/1993 | Cycon ...................... | 74/665 F |
| 5,419,513 A | * | 5/1995 | Flemming et al. ......... | 244/12.2 |
| 5,470,202 A | * | 11/1995 | Lemont .................... | 415/211.1 |
| D418,805 S |   | 1/2000 | Cycon ........................ | D12/326 |
| 6,170,778 B1 |   | 1/2001 | Cycon ............................ | 244/6 |
| 6,270,038 B1 |   | 8/2001 | Cycon ....................... | 244/12.3 |

* cited by examiner

Primary Examiner—J. Woodrow Eldred
(74) Attorney, Agent, or Firm—Carlson Gaskey & Olds PC

(57) ABSTRACT

A cooling system for a hybrid aircraft includes an inlet which extends through the body to communicate airflow to a powerplant subsystem and out through an exhaust within a rotor duct. In a hover mode, there is a significant low-pressure area created inside the rotor duct by the rotor system. The low-pressure area within the rotor duct assists in drawing air through the inlet and over the engine via the exhaust. A cooling fan is located adjacent the inlet to augment cooling-air flow. The cooling fan is smaller than conventional practice because it does not have to provide the entire pressure difference to force air-cooling flow over the engine. In a transition mode, the low-pressure area created inside the rotor duct decreases but ram air pressure through the inlet increases. In a forward flight mode, the pressure inside the rotor duct is approximately atmospheric but significant ram air is provided from the inlet due to forward flight speed.

30 Claims, 3 Drawing Sheets

COOLING SYSTEM FOR A HYBRID AIRCRAFT

This invention was made with government support under Contract No.: M67854-99C-2081 awarded by the Department of the Army. The government therefore has certain rights in this invention.

BACKGROUND OF THE INVENTION

The present invention relates to a hybrid aircraft, and more particularly, to directing cooling air flow from an inlet to an exhaust within a rotor duct of a hybrid unmanned aerial vehicle (UAV).

There is an increased emphasis on the use of UAVs for performing various activities in both civilian and military situations where the use of manned flight vehicles may not be appropriate. Such missions include surveillance, reconnaissance, target acquisition, target designation, data acquisition, communications relay, decoy, jamming, harassment, ordinance delivery, or supply.

A hybrid aircraft provides the hover and low-speed maneuverability of a helicopter with the high-speed forward flight and duration capabilities of a winged aircraft. Capability for such flight modes creates complications for a cooling system which must always provide adequate air-cooling flow to a vehicle engine. Providing adequate air-cooling flow is further complicated as the engine is typically buried within the vehicle body. In one conventional cooling system a cooling fan or "blower" arrangement provides substantial airflow over the engine irrespective of the aircraft's flight mode. Disadvantageously, providing adequate cooling-air flow in all hybrid aircraft flight modes requires a cooling system which may be rather heavy and complicated.

Accordingly, it is desirable to provide a cooing system for a hybrid aircraft which is lightweight, uncomplicated and provides adequate cooling air flow in all flight modes.

SUMMARY OF THE INVENTION

A cooling system for a hybrid aircraft according to the present invention includes an inlet in the body and an exhaust within a rotor duct. An air-cooling flow path for an air-cooling system is thereby provided from the inlet, over a powerplant subsystem and into the rotor duct through the exhaust.

A cooling fan is located adjacent the inlet to supplement the air-cooling flow from the inlet. The cooling fan is integrated with an engine flywheel to minimize packaging space, size and weight.

In a hover mode, there is a significant low-pressure area created inside the rotor duct by a rotor system. The low-pressure area within the rotor duct assists in drawing air through the inlet and over an engine via the exhaust. The low-pressure area within the rotor duct provides a portion of the necessary air-cooling flow over the engine. The cooling fan need only supplement the air-cooling flow. A more compact and lighter system is thereby provided. In addition, a greater percentage of power from the engine is available to the rotor system.

In a transition mode, the low-pressure area created inside the rotor duct decreases. Ram air pressure through the inlet, however, increases due to the increase forward flight speed. The net air-cooling flow is approximately the same as in hover mode.

In a forward flight mode, the pressure inside the rotor duct is near atmospheric and there is no air-flow draw through the exhaust. However, ram air through the inlet is substantially increased due to the forward flight speed. Moreover, the ram air pressure through the inlet creates a pressure differential between the inlet and exhaust to assure a continuous air-cooling flow over the engine.

A muffler is also exhausted directly through the exhaust to minimize openings in the vehicle body. By diffusing the heated exhaust from the muffler into the rotor duct, the heat signature of the hybrid aircraft is advantageously reduced.

The present invention therefore provides a cooling system for a hybrid aircraft which is light weight, uncomplicated and provides adequate cooling air flow in all flight modes.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1A:
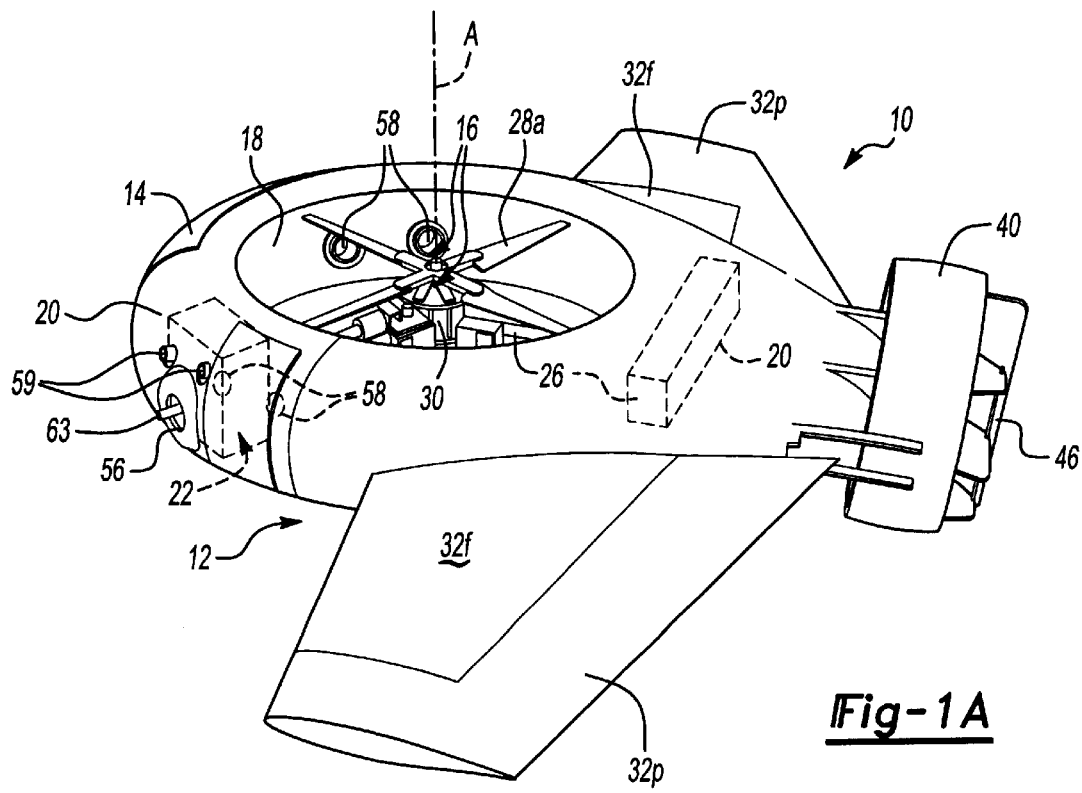
FIG. 1A is a general perspective view of a hybrid aircraft having a cooling system according to the present invention.

FIG. 1A illustrates a hybrid aircraft 10, such as the Unmanned Aerial Vehicle (UAV) developed by Sikorsky Aircraft Corporation. For further understanding of the UAV embodiment and associated components thereof, attention is directed to U.S. Pat. No. 6,270,038 entitled "Unmanned Aerial Vehicle With Counter-Rotating Ducted Rotors and Shrouded Pusher-Prop," which is assigned to the assignee of the instant invention and which is hereby incorporated herein in its entirety. It should be further understood that other hybrid aircraft (manned and unmanned) will also benefit from the instant invention.

The aircraft 10 includes a body 12 with a toroidal portion 14 having a generally hemi-cylindrical aerodynamic profile A rotor assembly 16 is mounted within a duct 18 that extends substantially vertically through the body 12. The duct 18 is defined about a rotor axis of rotation A.

The body 12 includes a plurality of internal bays 20 for housing and/or storing aircraft flight and mission components. The bays 20 house one or more powerplant subsystems 22 and a flight control system 24 positioned within the bays to balance the aircraft about the center of the rotor assembly. The flight control system 24 generally includes flight computers, transmitters, receivers, navigation sensors and attitude sensors well known in the UAV field.

Mission related sensors 25, such as a camera system, forward looking infrared radar (FLIR) sensor, laser designator, thermal imager, communications, or the like are also preferably located in a trainable turret 27 (FIG. 1C) in a forward area 29 of the vehicle 10. It should be understood that although a particular component arrangement is disclosed in the illustrated embodiment, other arrangements, replaceable mission packages, weapon systems and the like will benefit from the instant invention.

A plurality of struts 26 extend between the body and the rotor assembly 16 to rigidly attach the rotor assembly 16 and the body 12 for supporting the rotor assembly 16 in a fixed co-axial relation with respect to the duct 18. The support struts 26 also provide structural rigidity to the aircraft duct 18 to prevent flight and ground loads from distorting the body 12. The support struts 26 are hollow structures that can be used as conduits for interconnecting operating elements of the UAV 10.

The rotor assembly 16 includes a pair of multi-bladed, counter-rotating rotors 28a, 28b, coaxially aligned with the duct 18, and a coaxial transmission subassembly therebetween (illustrated somewhat schematically at 30). Each counter-rotating rotor 28a, 28b preferably includes a plurality of blade assemblies in which blade pitch changes induced in the counter-rotating rotor systems 28a, 28b, i.e., cyclic and/or collective pitch inputs, can be utilized to generate lift, pitch, yaw, and roll control of the aircraft 10. Roll control is preferably provided by roll cyclic of the multi-bladed, counter-rotating rotors 28a, 28b through upper and lower swashplates or the like.

Figure 1B:
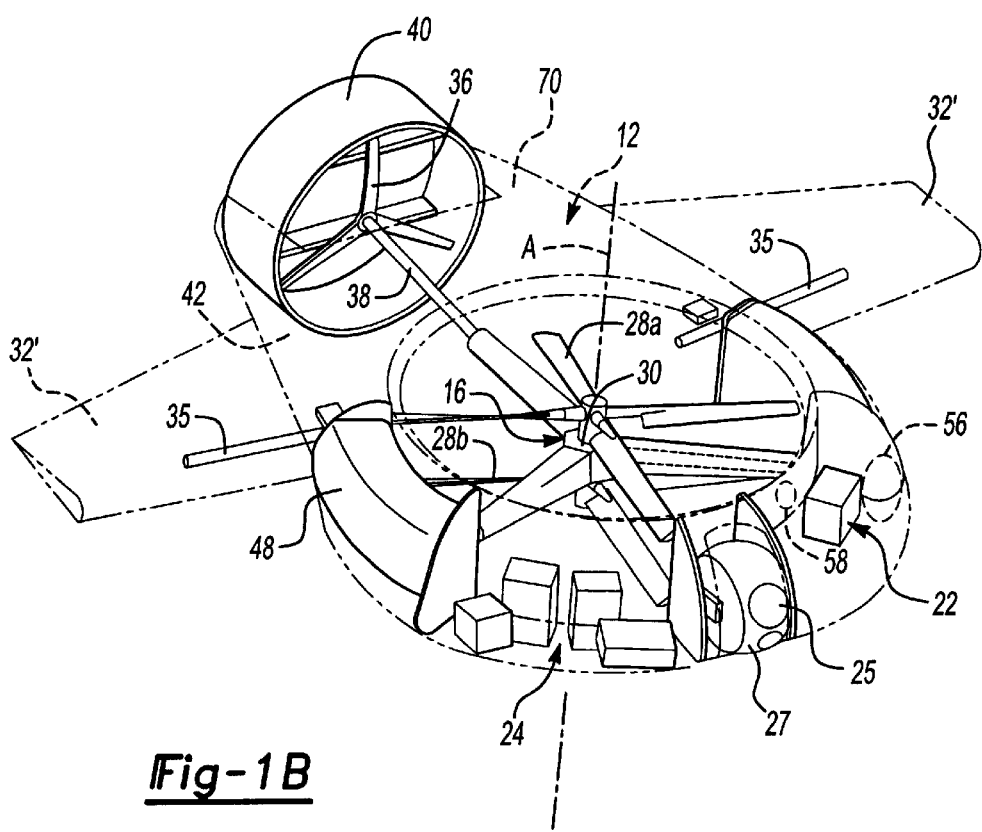
FIG. 1B is a perspective partial phantom view of the hybrid aircraft of FIG. 1A.
Figures 1C, 1D:
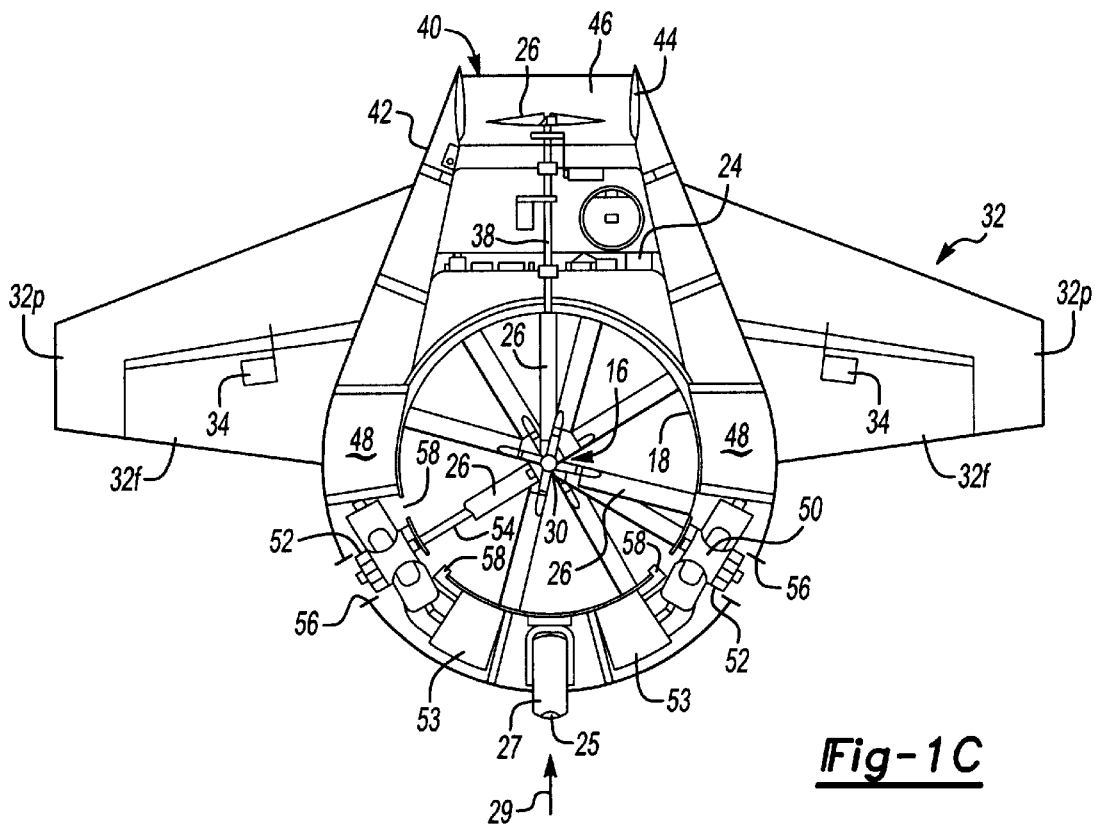
FIG. 1C is a top partial phantom view of the hybrid aircraft of FIG. 1A.
FIG. 1D is an exploded perspective view of an engine compartment of the hybrid aircraft of FIG. 1A.

Wings 32 extend laterally outward from the aircraft body 12 to provide high lifting forces and a large nose-down pitching moment in forward translational flight. Those skilled in the art would readily appreciate the diverse wing arrangements that can be incorporated into a UAV according to the present invention. Preferably, each wing 32 includes a fixed stub portion 32F and a pivotal flight control surface portion 32P such as a flaperon or aileron. The flight control surface portion 32P preferably includes a flaperon hingedly mounted to the trailing edge of the wing 32. A servo actuator 34 mounted within the fixed portion 32F controls the pivoting of the pivotal portion 32P (FIG. 1C). Alternatively, or in addition, the entire wing 32' may pivot such that a drive rod 35 independently changes the angle of attack of the entire wing 32' (FIG. 1B).

To provide translational thrust, the aircraft 10 includes a pusher prop 36 mounted to a rear portion of the vehicle 10. The prop 36 is mounted to a drive shaft 38 which, in turn, is engaged with the powerplant subsystem through a flexible coupling or the like (FIG. 1B). The prop 36 is preferably mounted to the rear of the aircraft with its rotational axis oriented substantially horizontal.

A prop shroud 40 is formed on the aft body 42 and around the pusher prop 36. The cross-sectional shape of the shroud 40 is preferably configured as an airfoil to provide the shroud 40 with a lift component. Mounted on the shroud 40 aft of the pusher prop 36 are one or more horizontal and vertical control surfaces 44,46. Preferably, the control surfaces 44,46 are pivotally mounted to the shroud 40 to permit the exhausted air to be channeled in a controllable manner such that the horizontal control surfaces 44 function as elevators and the vertical control surfaces 46 function as rudders.

Referring to FIG. 1C, each powerplant subsystem 22 includes one or more fuel tanks 48, an engine (illustrated schematically at 50), a cooling fan (illustrated schematically at 52) and a drive shaft 54. The driveshaft 54 extends through a support strut 26 to transfer power developed by the engine 50 to the coaxial transmission 30 to drive the rotor assembly 16 and the prop 36. The cooling fan 52 provides cooling-air flow over the engine 50 while mufflers 53 are mounted in communication with each engine 30 to reduce engine noise levels. The fuel tanks 48 are disposed within appropriate internal bays to maintain a relatively constant center of gravity for the UAV 10 during flight operations.

An inlet 56 (also illustrated in FIG. 1A) extends through the body 12 to communicate airflow to the powerplant subsystem 22. An exhaust 58 (also illustrated in FIG. 1A) extends through the body 12 within the duct 18 to communicate airflow from the powerplant subsystem 22.

A cooling system 57 thereby provides an air-cooling flow path (illustrated schematically by arrows p in FIGS. 2A–2C) from the inlet 56 in the front of the body 12 through the powerplant subsystem 22 and into the rotor duct 18 through the exhaust 58. The cooling system 57 also includes a cooling fan 52 located adjacent the inlet 56 to supplement the air-cooling flow. Preferably, the cooling fan 52 is integrated with the engine flywheel to further minimize packaging space (FIG. 1D). Preferably, an inlet 56 is provided for each carburetor 59 and for a cooling fan intake 61 (also illustrated in FIG. 1D). A starter fitting 63 also preferably extends through the inlet 56 to the cooling fan inlet 61 to provide for external engine 50 starting. An exhaust 58 is preferably provided for each muffler exhaust pipe 65 (also illustrated in FIG. 1D). Although illustrated, as substantially round inlet and exhaust ducts in the disclosed embodiment, it should be understood that the terms "inlet" and "exhaust" should be construed broadly to include one or more openings of various shapes, arrangements, locations and paths.

Preferably, the cooling system 57 provides air-cooling flow directly to the engine 50 through a shroud arrangement 67 (FIG. 1D), however, other system components will also benefit from the present invention. That is, ducting may alternatively or additionally be provided to other components such as avionics for cooling thereof.

Figure 2A:
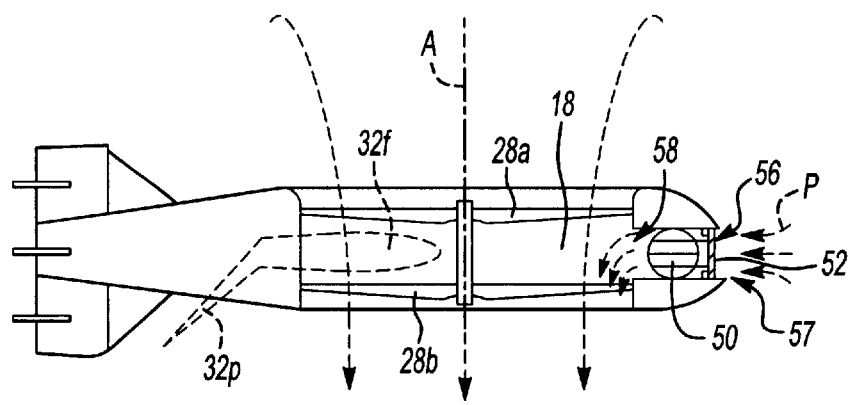
FIG. 2A is a schematic representation of a cooling air flow for a hybrid aircraft designed according to the present invention while in a hover mode.

Referring to FIG. 2A, the UAV 10 is illustrated in a hover mode. In hover there is a significant low-pressure area created inside the rotor duct 18 by the rotor system 16. The low-pressure area within the rotor duct 18 assists in drawing air through the inlet 56 and over the engine 50 via the exhaust 58. The low-pressure area created inside the rotor duct 18 provides approximately one-half the necessary air-cooling flow over the engine 50. The cooling fan 52 is much smaller and lighter than conventional practice because it does not have to provide the entire pressure difference to force air-cooling flow from the inlet 56 to the exhaust 58 over the engine 50. The cooling fan 52 need only supplement the air-cooling flow. A more compact and lighter system is thereby provided. In addition, a greater percentage of power from the engine 50 is available for the rotor system 16.

Figure 2B:
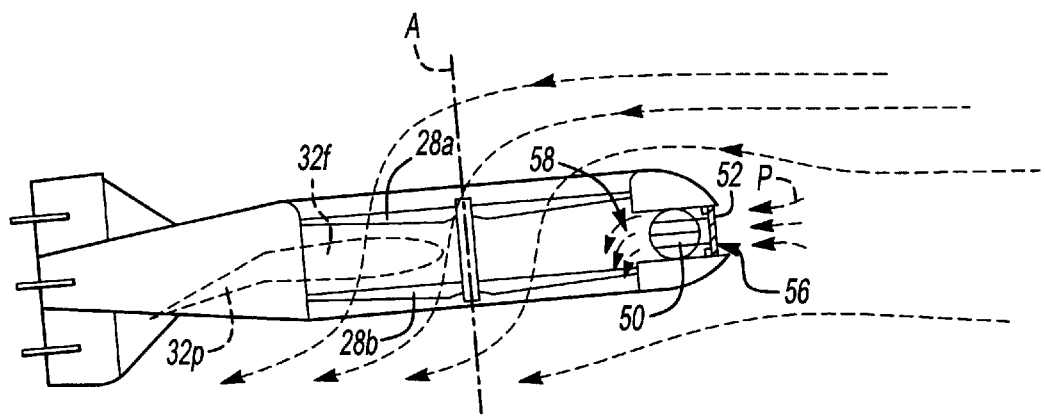
FIG. 2B is a schematic representation of a cooling air flow for a hybrid aircraft designed according to the present invention while in a transition mode.

Referring to FIG. 2B, the UAV 10 is illustrated in a transition mode. In transition, the low-pressure area created inside the rotor duct 18 decreases. Ram air pressure through the inlet 56, however, increases due to increase in forward flight speed. The net result is approximately the same air-cooling flow as in hover mode. The cooling fan 52 need only be sized to provide a supplemental air-cooling flow.

Figure 2C:
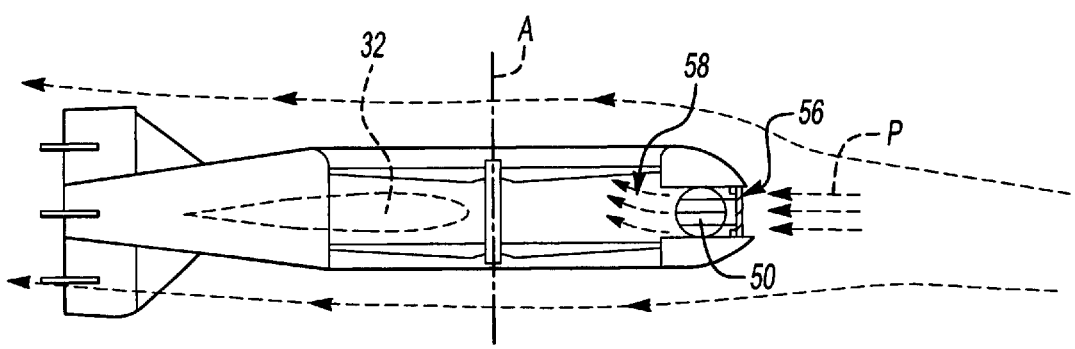
FIG. 2C is a schematic representation of a cooling air flow for a hybrid aircraft designed according to the present invention while in a forward flight mode.

Referring to FIG. 2C, the UAV 10 is illustrated in a forward flight mode. In forward flight the pressure inside the rotor duct is approximately atmospheric and there is no draw on the exhaust 58. However, significant ram air pressure through the inlet 56 is provided due to forward flight speed. Moreover, the ram air pressure through the inlet 56 creates a pressure differential between the inlet 56 and exhaust 58 to assure air-cooling flow over the engine 50. The net result is that the cooling fan 52 again need only be sized to provide a supplemental air-cooling flow.

The inlet 56 and exhaust 58 size, shape and flow therethrough are preferably tailored to provide a predetermined air-cooling flow volume in each flight mode. The cooling fan 52 need only be sized to provide supplemental air-cooling flow to the engine 50, however, other air-cooling flow demands and ancillary supply to other components will also benefit from the present invention.

The heated exhaust from muffler 53 is discharged directly through the exhaust 58 to minimize openings in the body 12. Moreover, by diffusing the heated exhaust from the muffler 53 through the rotor duct 18, the heat signature of the UAV 10 is advantageously reduced.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A cooling system for a hybrid aircraft comprising:
   a body comprising a forward portion and a rotor duct, said rotor duct defined about a rotor axis;
   an inlet in communication with said forward portion, said inlet substantially perpendicular to said rotor axis; and
   an exhaust in communication with said rotor duct, said exhaust substantially perpendicular to said rotor axis, said inlet in communication with said exhaust to provide an air-flow therethrough.

2. The cooling system as recited in claim 1, wherein said body comprises a toroidal portion.

3. The cooling system as recited in claim 1, wherein said body comprises a generally hemi-cylindrical aerodynamic profile.

4. The cooling system as recited in claim 1, further comprising a counter-rotating rotor assembly within said rotor duct.

5. The cooling system as recited in claim 1, further comprising a wing extending from said body.

6. The cooling system as recited in claim 1, further comprising an engine and a cooling fan, said cooling fan located adjacent said engine and said inlet.

7. The cooling system as recited in claim 6, further comprising a muffler in communication with said engine, said muffler discharging through said exhaust.

8. The cooling system as recited in claim 6, wherein said body defines a bay, said inlet and said exhaust in communication with said bay.

9. A hybrid aircraft comprising:
   a body comprising a toroidal portion and a rotor duct, said rotor duct defined about a rotor axis;
   an inlet in communication with said toroidal portion, said inlet substantially perpendicular to said rotor axis; and
   an exhaust in communication with said rotor duct, said exhaust substantially perpendicular to said rotor axis, said inlet in communication with said exhaust to provide an air-flow therethrough.

10. The hybrid aircraft as recited in claim 9, further comprising a counter-rotating rotor assembly within said rotor duct.

11. The hybrid aircraft as recited in claim 9, further comprising a wing extending from said body.

12. The hybrid aircraft as recited in claim 9, further comprising a ducted pusher prop extending from said body.

13. The hybrid aircraft as recited in claim 9, wherein said inlet is located within a forward portion of said toroidal portion.

14. The hybrid aircraft as recited in claim 9, wherein said body defines a bay, said inlet and said exhaust in communication with said bay.

15. The hybrid aircraft as recited in claim 14, further comprising a powerplant subsystem within said bay.

16. The hybrid aircraft as recited in claim 15, wherein said powerplant subsystem comprises a cooling fan located adjacent an engine and said inlet.

17. The hybrid aircraft as recited in claim 16, further comprising a muffler in communication with said engine, said muffler discharging through said exhaust.

18. A method of providing an air-flow through a body of a hybrid aircraft having a rotor duct, said method comprising the step of:
   (1) communicating the air-flow substantially perpendicular to a rotor axis from an inlet to an exhaust in communication with said rotor duct.

19. A method as recited in claim 18, further comprising the step of:
   augmenting said air-flow with an engine-driven cooling fan.

20. A method as recited in claim 18, further comprising the step of:
   discharging an engine exhaust through said exhaust.

21. The cooling system as recited in claim 1, further comprising an engine between said intake and said exhaust.

22. The cooling system as recited in claim 21, wherein said engine drives a counter-rotating rotor assembly within said rotor duct and a translational trust subsystem remote from said rotor duct.

23. The cooling system as recited in claim 21, wherein said engine is mounted within said body.

24. The cooling system as recited in claim 1, wherein each of said intake and said exhaust comprise an aperture through said body.

25. The hybrid aircraft as recited in claim 9, further comprising an engine between said intake and said exhaust.

26. The hybrid aircraft as recited in claim 25, wherein said engine drives a counter-rotating rotor assembly within said rotor duct and a translational thrust subsystem remote from said rotor duct.

27. The hybrid aircraft as recited in claim 25, wherein said engine is mounted within said body.

28. The hybrid aircraft as recited in claim 9, wherein each of said intake and said exhaust comprise an aperture through said body.

29. A method as recited in claim 18, further comprising the step of:
   (a) communicating the air-flow over an engine located between the intake and the exhaust.

30. A method as recited in claim 18, further comprising the step of:
   (a) driving a counter-rotating rotor assembly within the rotor duct and a translational thrust subsystem remote from the rotor duct.

* * * * *